(12) United States Patent
Komatsu et al.

(10) Patent No.: US 6,417,587 B1
(45) Date of Patent: *Jul. 9, 2002

(54) MOTOR

(75) Inventors: Izumi Komatsu; Hirohiko Katsuno, both of Nagano (JP)

(73) Assignee: Sankyo Seiki Mfg. Co., Ltd., Nagano-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/839,166

(22) Filed: Apr. 23, 1997

(30) Foreign Application Priority Data

Apr. 25, 1996 (JP) .............................................. 8-103005
Aug. 7, 1996 (JP) .............................................. 8-208318

(51) Int. Cl.$^7$ .............................................. H02K 29/08
(52) U.S. Cl. .............. 310/68 B; 338/32 R; 324/207.21
(58) Field of Search ............................. 310/68 B, 68 R, 310/67 R, DIG. 6, 191, 209, 267, 268; 29/596; 338/32 R; 324/207.21, 252; 322/49, 51, 52; 318/830, 831, 806, 199, 823, 721, 647, 652, 653

(56) References Cited

U.S. PATENT DOCUMENTS

| | | | | |
|---|---|---|---|---|
| 3,852,103 A | * | 12/1974 | Collins et al. ............. | 338/32 R |
| 4,329,636 A | * | 5/1982 | Uchida et al. ............... | 318/721 |
| 4,628,259 A | * | 12/1986 | Takahashi et al. ...... | 324/207.21 |
| 4,639,807 A | * | 1/1987 | Sekizawa et al. ........... | 360/113 |
| 4,801,830 A | * | 1/1989 | Ogino et al. ............... | 310/68 B |
| 4,851,771 A | * | 7/1989 | Ikeda et al. ............ | 324/207.21 |
| RE34,443 E | * | 11/1993 | Takahashi et al. ...... | 324/207.21 |
| 5,408,153 A | * | 4/1995 | Imai et al. ................. | 310/68 B |
| 5,422,569 A | * | 6/1995 | Nakahara et al. ........... | 324/174 |
| 5,477,143 A | * | 12/1995 | Wu ....................... | 324/207.21 |
| 5,552,682 A | | 9/1996 | Ushikoshi .................... | 318/254 |
| 5,574,364 A | * | 11/1996 | Kajimoto et al. ....... | 324/207.12 |
| 5,610,457 A | * | 3/1997 | Kurita ....................... | 310/68 B |
| 5,939,849 A | | 8/1999 | Ushikoshi ................... | 318/254 |

FOREIGN PATENT DOCUMENTS

JP          1-2039227          8/1989

* cited by examiner

Primary Examiner—Nicholas Ponomarenko
Assistant Examiner—Dang Dinh Le
(74) Attorney, Agent, or Firm—Reed Smith LLP

(57) ABSTRACT

A motor comprises a rotor having an index signal generating portion on a rotor magnet and a magnetic resistance sensor having a magneto-sensitive surface. The sensor is positioned on a stator of the motor facing the index signal generating portion of the rotor with a predetermined gap. The sensor functions to sense an index signal in the magnetic field generated by the index signal generating portion during the rotation of the rotor. A speed detection circuit is included for detecting the speed of the motor based on the detection results of the magnetic resistance sensor. The index generating portion forms a magnetic area in which a magnetic flux intensity in a plane orthogonal to the principal magnetic flux of the index signal generating portion is greater than the rated sensitivity of the magnetic resistance sensor. The magnetic resistance sensor is positioned on the magnetized area such that its magneto-sensitive surface is parallel to the plane. The magnetic resistance sensor has an output which is in a saturated state.

10 Claims, 6 Drawing Sheets

AN END SURFACE FORCED THE MAGNETIC RESISTANCE SENSOR 1

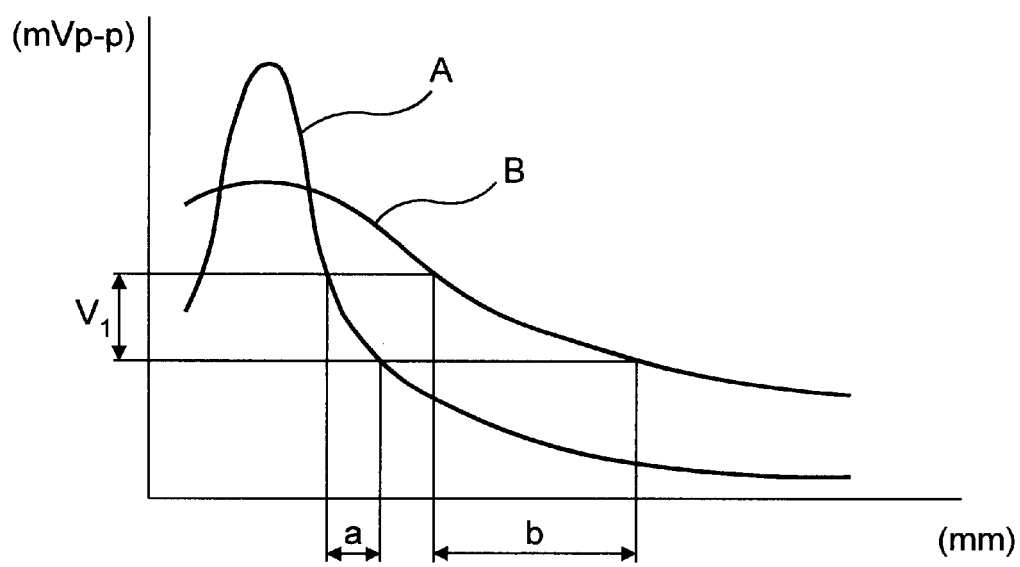
F I G. 5
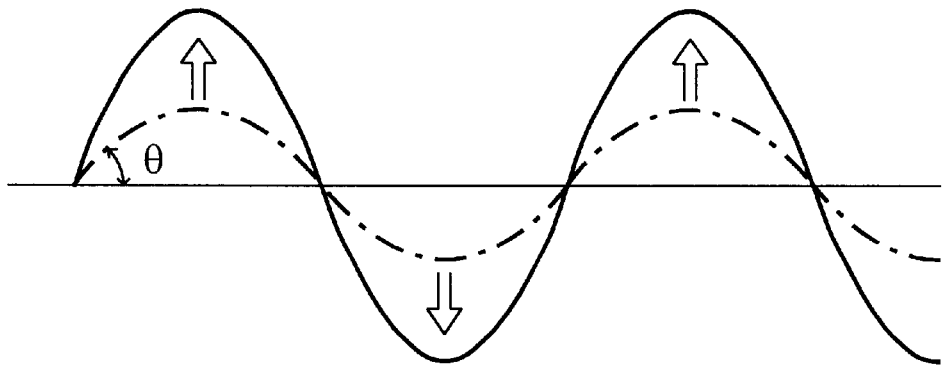
F I G. 6

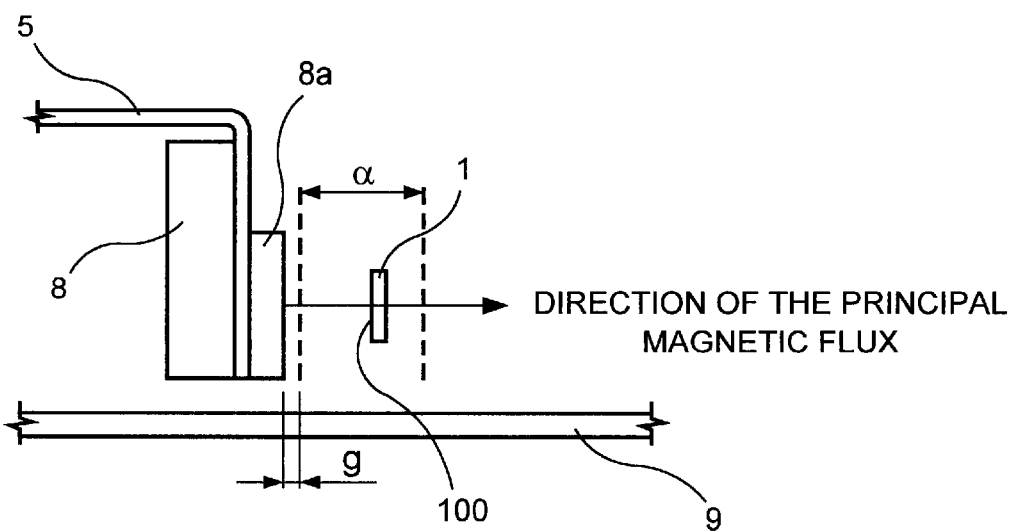
F I G. 9

MOTOR

BACKGROUND OF THE INVENTION a) Field of the Invention

The present invention relates to a motor which has a rotor magnet having an index signal generating portion which generates an index signal to be detected by a magnetic resistance sensor while rotating together with a rotor.

b) Description of the Related Art

Among various compact motors such as capstan motors used for VCRs, audio tape recorders, etc., there is a widely known speed detection mechanism in which a index signal generating portion is formed on the outer peripheral surface of the rotor and a magnetic resistance sensor is arranged opposite in the vicinity to detect the speed of the rotor.

The magnetic resistance sensor is positioned at a position where the intensity of the magnetic field formed by the index signal generating portion becomes slightly lower than the rated sensitivity of the magnetic resistance sensor to obtain highly sensitive detection capability. For this reason, if the gap between the index signal generating portion and the magnetic resistance sensor deviates even a little, accordingly the amplitude of the output changes easily. Therefore, it is critical to minimize errors in gap as much as possible.

In a typical example, the gap between an index signal generating medium and a magnetic resistance sensor is set to be about 100 μm. In this case, it is critical for the gap therebetween to be set within about ±30 μm of tolerance to obtain a precise output from the magnetic resistance sensor. However, such a highly accurate positioning is very difficult to achieve.

The magnetic resistance sensor of the kind disclosed in, for example, Japanese Patent Kokai H1-203922 (1989), is mounted on a movable holder to determine an optimal position for the magnetic resistance sensor.

In other words, in the motor disclosed in the specification as shown in FIG. 10, an index signal generating medium 26, on which a plurality of magnets with alternate magnetic poles (S, N) are placed, is attached to the outer peripheral surface of a rotor 27, and the magnetic resistance sensor 21 is mounted on a holder 22 such that its magneto-sensitive surface faces the index signal generating medium 26. The holder 22 is constructed with a fixed holder which is secured on a printed circuit board 25 and a movable holder which is supported by the fixed holder in the radial direction of the motor.

While moving the magnetic resistance sensor 21 supported by the movable holder in the radial direction of the motor, the output signal from the magnetic resistance sensor 21 is monitored; based on the results, the magnetic resistance sensor 21 determines its optimal position. After determining the optimal position of the magnetic resistance sensor 21, a lead frame 24 of the movable holder on which the magnetic resistance holder 21 is loaded is secured on the printed circuit board 25 to fix the position of the magnetic resistance sensor 21.

In the motor of conventional as described above, it is critical to determine a highly accurate position of the magnetic resistance sensor with respect to the index signal generating portion. For this, a creative positioning is required. There are also many steps needed for determining the position. Further, the above mentioned method uses a holder mechanism in which a movable holder and a fixed holder are required for positioning the magnetic resistance sensor; this increases the number of components, because of the components needed for the mechanism, and the manufacturing cost accordingly.

OBJECT AND SUMMARY OF THE INVENTION

Taking into account the above problems, the primary objective of the present invention is to provide a motor which can precisely detect the rotation speed and the like without requiring a highly accurate positioning of the magnetic resistance sensor of conventional technology.

In accordance with the invention, a motor comprises a rotor having an index signal generating portion on a rotor magnet and a magnetic resistance sensor having a magneto-sensitive surface. The sensor is positioned on a stator of the motor facing the index signal generating portion of the rotor with a predetermined gap. The sensor functions to sense an index signal in the magnetic field generated by the index signal generating portion during the rotation of the rotor. A speed detection circuit is included for detecting the speed of the motor based on the detection results of the magnetic resistance sensor. The index generating portion forms a magnetic area in which a magnetic flux intensity in a plane orthogonal to the principal magnetic flux of the index signal generating portion is greater than the rated sensitivity of the magnetic resistance sensor. The magnetic resistance sensor is positioned on the magnetized area such that its magneto-sensitive surface is parallel to the plane. The magnetic resistance sensor has an output which is in a saturated state.

BRIEF DESCRIPTION OF THE DRAWINGS

In the drawings:

FIG. 5 is a graph showing the relationship between the gap created between the rotor magnet and the magneto-sensitive surface of the magnetic resistance sensor and the output voltage of the magnetic resistance sensor;

FIG. 6 is a wave profile of the output voltage from the magnetic resistance sensor;

FIG. 9 is a schematic drawing showing the range of positioning of the magnetic resistance sensor.

DESCRIPTION OF THE PREFERRED EMBODIMENTS

Figure 1A:
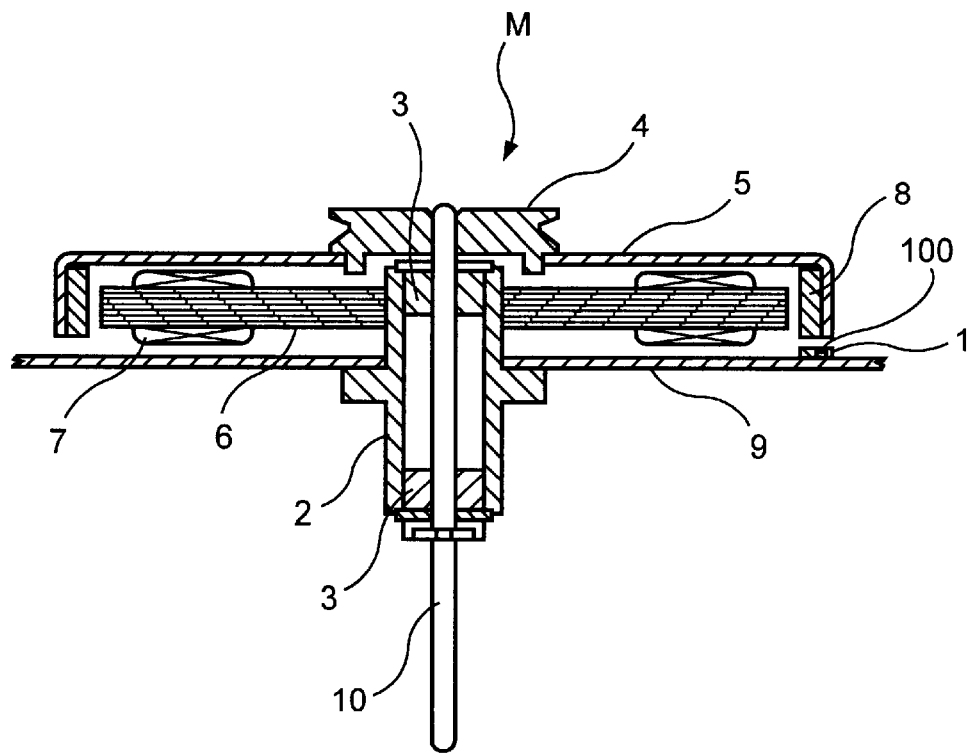
FIG. 1(a) is a vertical cross-section of a motor to which the present invention is applied.

A motor having a magnetic resistance sensor in which the present invention is applied is described in detail hereinafter referring to the drawings.

The Structure of a Motor

FIG. 1(a) shows a vertical cross-section of a capstan motor used in VCRs, etc., to which the present invention is applied.

The motor M has a stator substrate 9 and a cylindrical bearing holder 2 fixed thereon. A capstan shaft 10 is rotatably supported by the bearing holder 2 and a pair of bearings 3 at top and bottom which are supported by the inner peripheral surface of the bearing holder 2. On the top of the capstan shaft 10, a boss 4 is mounted, via which a rotor 5 made of magnetic material is fixed so as to rotate together with the capstan shaft 10. Fixed to the outer periphery of the bearing holder 2 is a stator core 6 having a plurality of salient-poles around which a coil 7 is wound. Fixed to the rotor 5 is a rotor magnet 8 such that it faces the stator core 6 at a predetermined distance.

On the stator substrate 9, a circuit (not illustrated) for driving the motor and a magnetic resistance sensor 1 connected thereto are mounted. In this embodiment, the magnetic resistance sensor 1 is seated on the stator substrate 9 such that a magneto-sensitive surface 100 thereof faces the annular end surface of the rotor magnet 8 by a predetermined gap in the thrust direction of the motor.

Figure 1B:
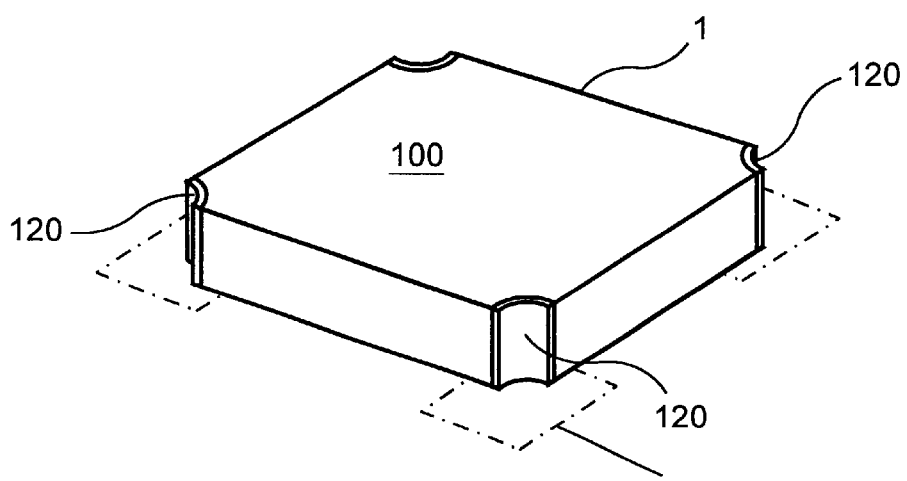
FIG. 1(b) is a perspective view of a magnetic resistance sensor therein.

Note that, taking into consideration the mounting of the magnetic resistance sensor 1 on the stator substrate 9, a Philip-chip type of magnetic resistance sensor 1 as shown in FIG. 1(b) is used, in which terminals (electrodes) 120 are soldered, using a through hole, at four corners on the top surface of the magneto-sensitive surface 100.

The Structure of the Rotor Magnet

Figure 2A:
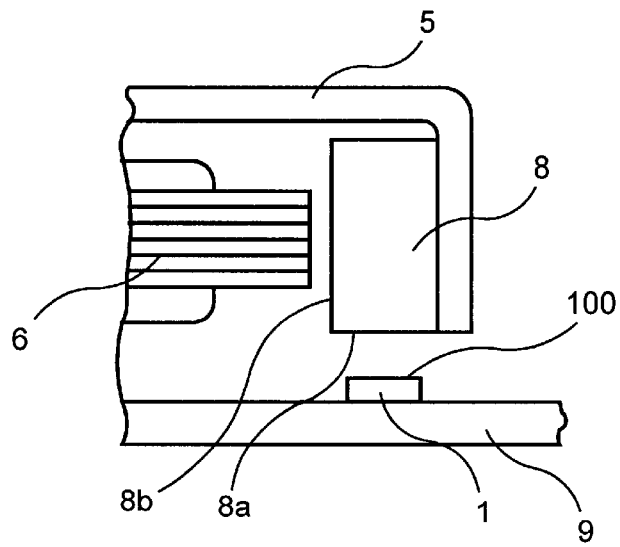
FIG. 2(a) is a vertical cross-section of a magnetic path of the motor of FIG. 1.

FIG. 2(a) shows a vertical cross-section of a magnetic path of the motor M. Referring to this drawing, the rotor magnet 8 is made of, for example, a ferromagnetic material, and comprises a motor driving magnetic portion 8b formed on the inner peripheral surface and a frequency generating potion 8(a) (hereinafter denoted as the FG signal generating portion) as an index signal generating portion. The FG signal generating portion 8a is magnetized with a narrower pitch of N and S poles than that of the driving magnetic portion 8b. The index signal generated by the FG signal generating portion along with the rotation of the rotor is detected by the magnetic resistance sensor 1 positioned opposite thereof in the thrust direction of the motor as described above.

Figure 2B:
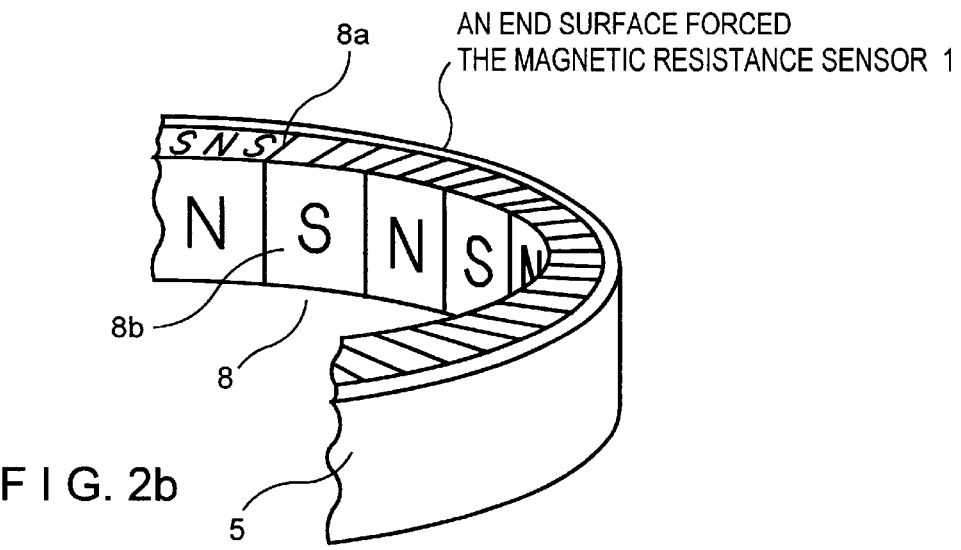
FIG. 2(b) is a perspective view of a partially magnified rotor magnet thereof.

FIG. 2(b) is a perspective view showing a partially magnified rotor magnet 8 shown in FIG. 2(a). The motor driving magnetic portion 8b formed on the inner peripheral surface of the rotor magnet 8 is magnetized with, for example, 16 magnetic poles in a circle. On the other hand, the FG signal generating portion 8a formed on the annular edge of the rotor magnet 8 is magnetized with, for example, 240 magnetic poles in a circle. Therefore, the motor M of this embodiment has the FG signal generating portion 8a whose magnetizing pitch is relatively wider than 360 magnetic poles/circle which is normally used in this type of motor.

Since the magnetizing pitch is made wide, even when magnetizing the magnet with the same magnitude of magnetizing current, the FG signal generating portion 8a can be magnetized deeply compared to one with a narrow magnetizing pitch. Therefore, the magnetic force of each of the magnetic poles is strengthened so that the magnetic flux reaches far. In other words, the magnetic field of the FG signal generating portion 8a is strong, increasing the strength of the magnetic field formed therearound, i.e., the intensity of the magnetic flux in a plane orthogonal to the principal magnetic flux of the FG signal generating portion 8a.

Then, in this embodiment, the magnetizing pitch is widened; the magnetic field formed by the FG signal generating portion 8a includes a magnetized area where the intensity of the magnetic flux in a plane orthogonal to the principal magnetic flux is greater than the rated sensitivity of the magnetic resistance sensory 1. In other words, the magnetic field intensity of the FG signal generating portion 8a is set so as to form such a specific magnetized area. The magnetic resistance sensor 1 is positioned such that the magneto-sensitive surface is parallel to the plane within this specific magnetized area, that is, the magneto-sensitive surface is orthogonal to the principal magnetic flux.

Note that the rotor magnet 8 is not limited to being made of ferromagnetic material, but also may be configured in the following way. That is, the portion for providing the driving magnetic portion 8b may be made of rare-earth magnet such as neodymium, and the portion at the bottom end for providing the FG signal generating portion 8a may be formed of ferromagnetic material; then, they may be integrally molded. With this constitution, the motor driving magnetic portion 8b is quite strongly magnetized, improving the motor function.

Figure 3:
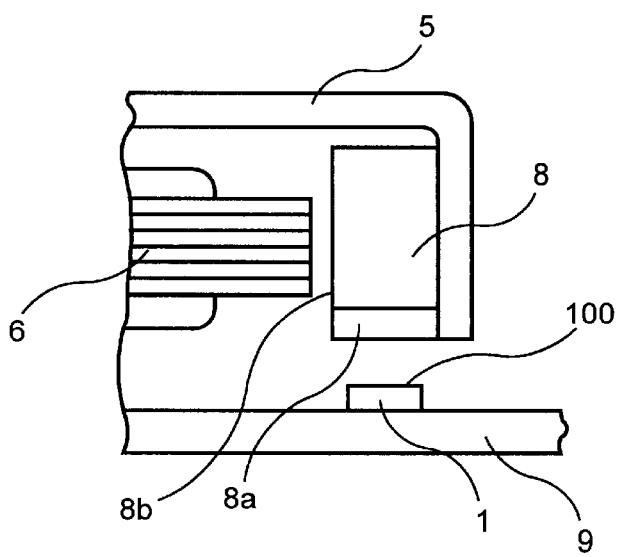
FIG. 3 is a vertical cross-section partially showing a modified example of the magnetic path shown in FIG. 2(a)

As shown in FIG. 3, the rotor magnet 8 may be constituted such that the driving magnetic portion 8b is formed on the inner peripheral surface thereof and a separate unit of signal generating magnets 18 (specifically, the FG signal generating portion 8a) is adhered to the annular end surface of the rotor magnet 8.

The Structure of the Magnetic Resistance Sensor

Figure 4A:
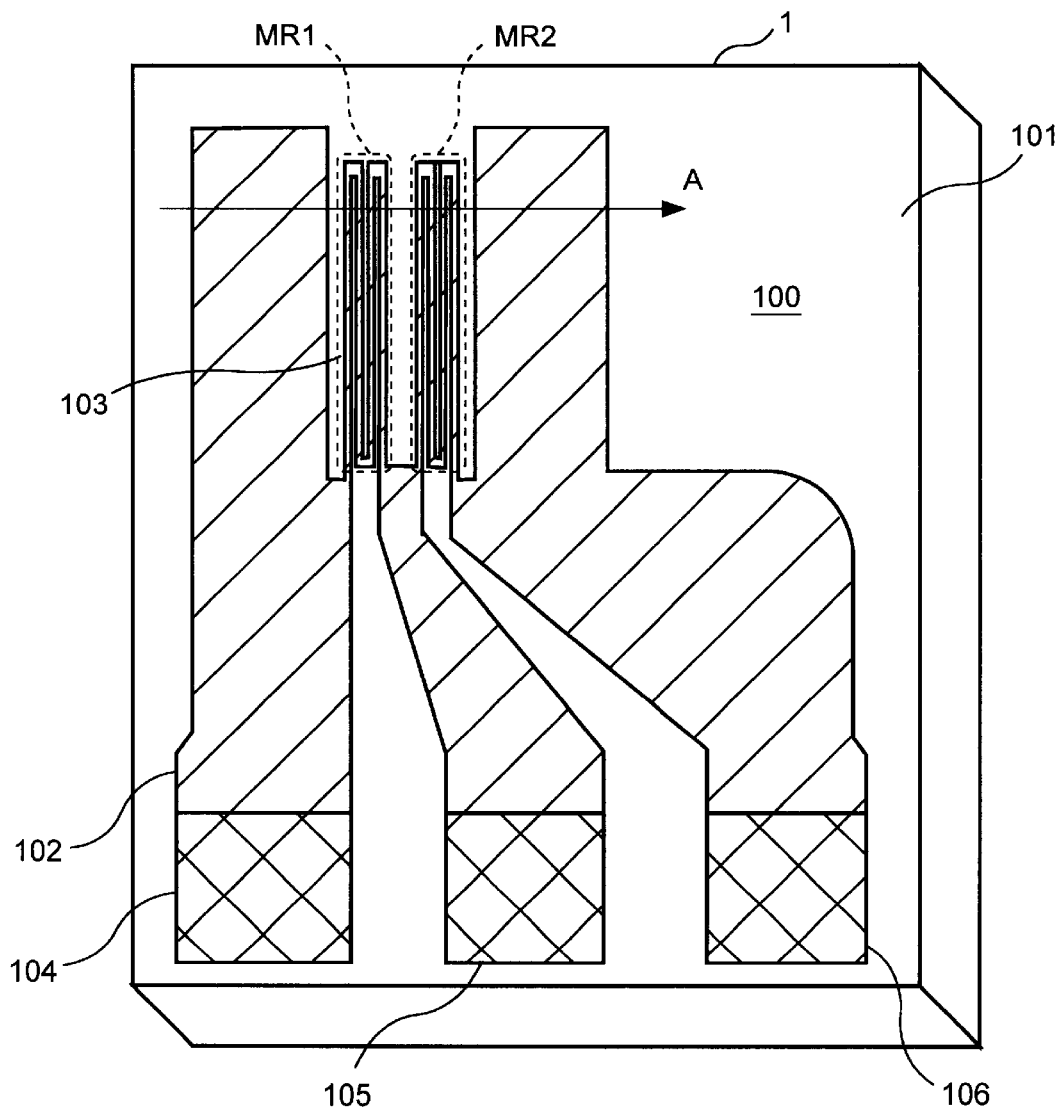
FIG. 4(a) is a magnified plan view of the magnetic resistance sensor of the motor to which the present invention is applied.
Figure 4B:
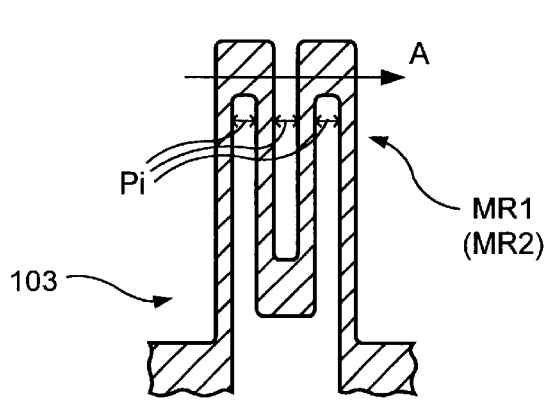
FIG. 4(b) is a descriptive magnified view showing one of the magnetic resistance devices thereof.

FIG. 4 shows a configuration of the magnetic resistance sensor 1 of this embodiment.

As shown in FIGS. 4(a) and (b), formed on an insulated chip substrate of the magnetic resistance sensor 1 is a magnetic resistance film 102 made of ferromagnetic material such as Ni—Fe or Ni—Co layered in a predetermined pattern. The surface on which the magnetic resistance film 102 is formed is the magneto-sensitive surface 100. A part of the magneto-sensitive surface 100 is a magneto-sensitive section 103.

At the magneto-sensitive section 103, a pair of magnetic resistance devices MR1 and MR2 (MR device), which are made in the same shape by a micro pattern on the magnetic resistance film 102 and are arranged in parallel along the direction (by arrow A) identical to the rotational direction of the rotor. These magnetic resistance devices MR1 and MR2 are displaced by ½ pitch with respect to the magnetizing pitch of the index signal generating portion (FG signal generating portion 8a) in the magnetic path. Terminals (electrodes) 104, 105, and 106 are drawn out of the magneto-sensitive section 103 for soldering. Except for the magneto-sensitive section 103 including the terminals (electrodes) 104, 105, and 106, the width of the magnetic resistance film 102 is wide so that there would be no problem in detecting the magnetic change.

Figure 4C:
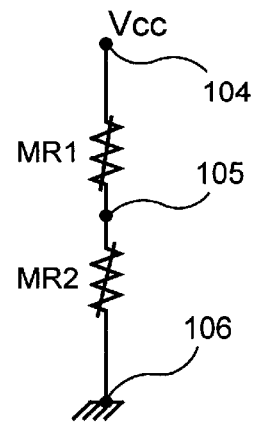
FIG. 4(c) is a circuit of how the magnetic resistance devices are used.

When using this magnetic resistance sensor 1 for detecting the rotational speed of the motor, the terminals (electrodes) 104, 105, and 106 are used respectively as an input terminal, an output terminal, and a terminal for grounding as shown in FIG. 4(c). Of these, the electrode 105 (output terminal) is connected to a speed detection circuit to be described later referring to FIG. 7.

This construction is the same as a conventional MR device; however, this embodiment and the conventional technology are different in the pitch of the magnetic resistance film 102 of the MR device. In other words, as shown magnified FIG. 4(*b*), in each of the magnetic resistance devices MR1 and MR2, the pitch Pi of the micro patterns of the magnetic resistance film 102 which are arranged in parallel along the direction (by arrow A) identical to the rotational direction of the rotor is made wider compared to a conventional magnetic resistance device of the same standard.

The Positioning of the Magnetic Resistance Sensor and Its Output Property

In the motor M of this embodiment configured in the above manner, the magnetizing pitch of the FG signal generating portion 8*a* is made wide so that the strength of the magnetic field formed therearound is increased to form the above mentioned specific magnetized area. In other words, within this magnetized area, the magnetic flux intensity in a plane orthogonal to the principal magnetic flux of the FG signal generating portion 8*a* is greater than the rated sensitivity of the magnetic resistance sensor 1; in addition, the output from the magnetic resistance sensor placed in the magnetic area is in a saturated state. The magnetic resistance sensor 1 is arranged in this magnetic field such that the magneto-sensitive surface 100 is orthogonal to the principal magnetic flux of the FG signal generating portion 8*a*. On the other hand, conventionally, the magnetic resistance sensor is arranged in an area whose intensity is slightly lower than the magnetic flux intensity at which its output saturates.

Further, since the FG signal generating portion 8*a* is strongly magnetized in this manner, a wide gap can be obtained between the FG signal generating portion 8*a* and the magnetic resistance sensor 1. For this reason, accordingly widened is the pitch Pi of a micro pattern of a ferrite film which constitutes the magneto-sensitive section 103 of the magnetic resistance sensor 1 in the above manner. When the pitch Pi of the micro pattern of the film is widened, the output property of the magnetic resistance sensor 1 is accordingly less affected by the deviation of the gap between the magnetic resistance sensor 1 and the FG signal generating portion 8*a*.

In this manner, the output property of the magnetic resistance sensor 1 does not depend on the gap very much compared to the conventional output property. Therefore, even if the magnetic resistance sensor 1 is not located with a high accurate positioning as conventional, a sufficiently accurate detection output can be obtained from the magnetic resistance sensor 1.

FIG. 5 is a graph comparing the effects of the deviation of the gap between the FG signal generating portion 8*a* and the magneto-sensitive surface with respect to the detection results of the magnetic resistance sensor.

In this graph, the vertical axis represents the output from the magnetic resistance sensor (peak to peak), and the horizontal axis represents the gap between the magnet (the FG signal generating portion) and the magnetic resistance sensor; the curve A shows an output property of a conventional magnetic resistance sensor, and the curve B shows an output property of the magnetic resistance sensor of this embodiment.

Comparing these output properties, the output property A of the conventional magnetic resistance sensor obtains a high profile in the area where the gap is small; however, while the peak at that time is precipitous, the output rapidly decreases as the gap widens. Therefore, in order to obtain an output V1 of constant level, the gap between the FG signal generating portion 8*a* and the magneto-sensitive surface needs to be set within a narrow range, a.

On the other hand, the output property B of the magnetic resistance sensor 1 of this embodiment obtains a lower profile than that of the output A of the conventional magnetic resistance sensor in the area where the gap is small; however, the output does not rapidly decrease even as the gap widens.

Then, it is understood that in this embodiment, the gap between the FG signal generating portion 8*a* and the magneto-sensitive surface 100 should be set within the range, b, (i.e., within the above mentioned specific magnetic area) which is wider than the range, a, to obtain the output V1 of constant level. That is, with the magnetic resistance sensor 1 of such property, the gap between the FG signal generating portion 8*a* and the magnetic resistance sensor 1 is set within the range of, for example, 300 $\mu$m±150 $\mu$m for assembly of the motor. In other words, it is not necessary that the positioning of the magnetic resistance sensor 1 should be adjusted so that the deviation of positioning is within the tolerance of ±30 $\mu$m as conventional.

Using the configuration of this embodiment in this manner makes it possible to enhance the tolerance for deviation of the gap between the magnetic resistance sensor and the FG signal generating portion 8*a*. Therefore, positioning of the magnetic resistance sensor during assembly will be easy; the magnetic resistance sensor 1 can be seated on the stator substrate 9 without an extra positioning adjustment. Further, the deviation of the sensor output due to the displacement of the motor 5 in the thrust direction during the operation of the motor can be ignored.

Note that, as the gap between the FG signal generating portion 8*a* and the magneto-sensitive surface 100 of the magnetic resistance sensor 1 becomes wider, as shown by one-dotted lines in FIG. 6, the angle $\theta$ (hereinafter referred to as "through-rate," $\theta$) of the output (the signal corresponding to the difference between the resistances of two MR devices, MR1 and MR2) from the terminal (electrode) 105 of the magnetic sensor 1 becomes small at the zero cross point, causing errors in detection of the rotation speed of the motor. However, in this embodiment, the magnetic resistance sensor 1 is positioned within the area where the magnetic field intensity holds the output from the magnetic resistance sensor 1 in a saturated status; the magnetic force exerted on the magneto-sensitive surface 100 of the magnetic resistance sensor 1 is stronger compared to the conventional positioning of the sensor in an area where the magnetic field intensity is lower than that at which the output from the sensor is saturated. For this reason, the through-rate $\theta$ is prevented from decreasing, which means there are no practical problems.

The Speed Detection Circuit/Waveform Shaping Circuit

The magnetic resistance sensor 1 is located in an area having a stronger magnetic field intensity than that at which its output saturates, and at the same time, the pitch Pi of the micro pattern of the magnetic resistance film 102, in the magneto-sensitive section 103 is made wide; therefore, the output property of the magnetic resistance sensor 1 easily becomes unstable. Once the unstable output from the magnetic resistance sensor includes noise, it causes errors in detection. In order to prevent the noise from being included, it is desirable that a coupling between the output side of the magnetic resistance sensor and the input side of the speed detection circuit, which detects the rotation speed of the motor based on the output from the sensor, is set to be a low impedance coupling.

Also the magnetic resistance sensor 1 is positioned in a magnetized area where the magnetic flux intensity in a plane orthogonal to the principal magnetic flux of the FG signal generating portion 8a is greater than the rated sensitivity of the magnetic resistance sensor 1; it is also in parallel with the plane of the magneto-sensitive surface 100 of the magnetic sensor 1; the output from the sensor 1 is in a saturated state. For this reason, it easily causes distortions in the waveform of the sensor output, causing errors in detection of the rotation speed of the motor. In order to avoid it, it is desirable to provide a waveform shaping circuit in the following manner with respect to the speed detection circuit which detects the rotational speed of the rotor 5.

Figure 7:
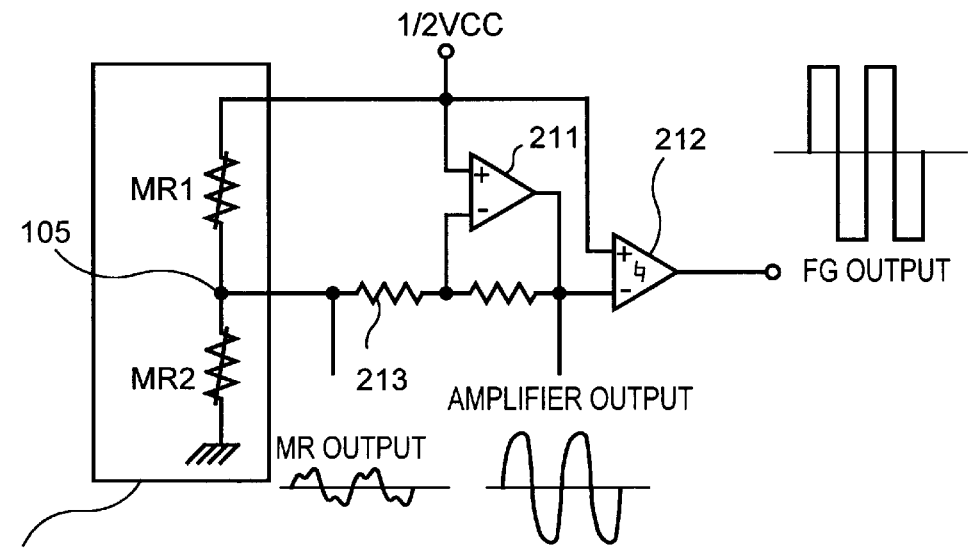
FIG. 7 shows a circuit in which the rotation detection is performed based on the output from the magnetic resistance sensor.

FIG. 7 shows an example of a waveform shaping circuit which is installed in the speed detection circuit. As shown in this figure, a waveform shaping circuit in the speed detection circuit comprises a linear amplifier 211 so that the output (signal corresponding the difference of the resistance values of the two MR devices, MR1 and MR2) from the terminal (electrode) 105 of the magnetic resistance sensor 1 is put into a reversed input terminal of the linear amplifier 211 through a resistance 213. To a non-reversed input terminal of the linear amplifier 211, a voltage equivalent to ½ of a driving voltage Vcc is applied. The output from the linear amplifier 211 is put into the reversed input terminal of a window comparator 212; the voltage which equals to ½ of the driving voltage Vcc is applied to the non-reversed input terminal.

Even when the output signal is distorted by that the saturated output from the magnetic resistance sensor 1, the speed detection circuit configured in this above manner amplifies the output through the linear amplifier 211, and cuts the distorted portion (outside the window) through the window comparator 212. For this reason, the wave profile of the output from the window comparator 212 is collected (not distorted).

In this manner, the linear amplifier 211 and the window comparator 212 constitute the waveform shaping circuit through which the distortion of the output signal from the magnetic resistance sensor 1 is eliminated. For this reason, even when a magnetic path which is easy to cause the distortion in the output waveform of the magnetic resistance sensor 1 is used as in this embodiment, the speed detection circuit eliminates the distortion, ensuring the rotation speed detection.

Other Embodiments

Figure 8A:
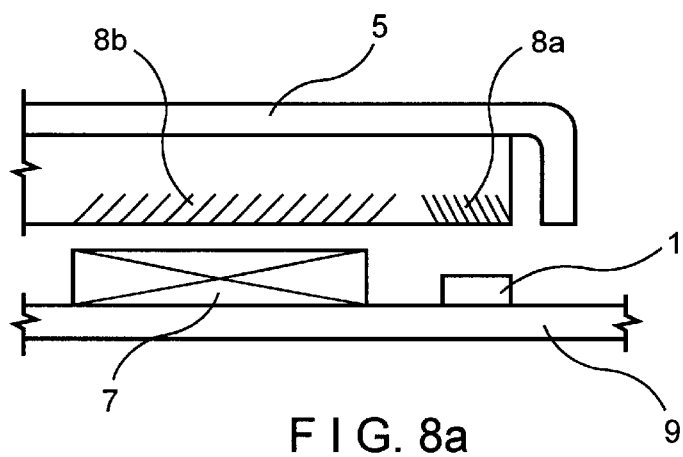
FIG. 8(a) and 8(b) are descriptive drawings showing the structure near the rotor magnet of another embodiment.
Figure 8B:
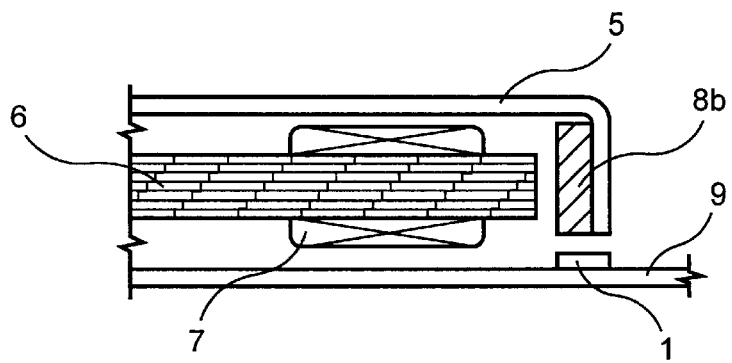

A motor to which the present invention may be applied, as shown in FIG. 8 (*a*), may be configured as follows: the rotor magnet 8 formed on the rotor side has a structure in that the portion opposite a coil 7 formed on the stator substrate 9 is a driving magnetized section 8b and the portion at the outer periphery opposite the magnetic resistance sensor 1 is an FG signal generating portion.

As shown in FIG. 8(*b*), the present invention may be applied to a motor which is configured as follows: the portion of the rotor magnet 8 opposite the magnetic resistance sensor 1 is also made to be a driving magnetic portion 8b which also functions as an index signal generating portion for detecting the rotational speed, so that the loss in magnetic flux of the driving magnetized section 8b can be detected by the magnetic resistance sensor. In general, this type cannot be employed because the obtained pulse number is too small for a capstan motor; however, in a drum motor and the like, for example, the FG signal with which the speed is detected can be produced with about 12 poles and 24 poles of driving magnetic poles, enabling this type of motor to be used.

Figure 10:
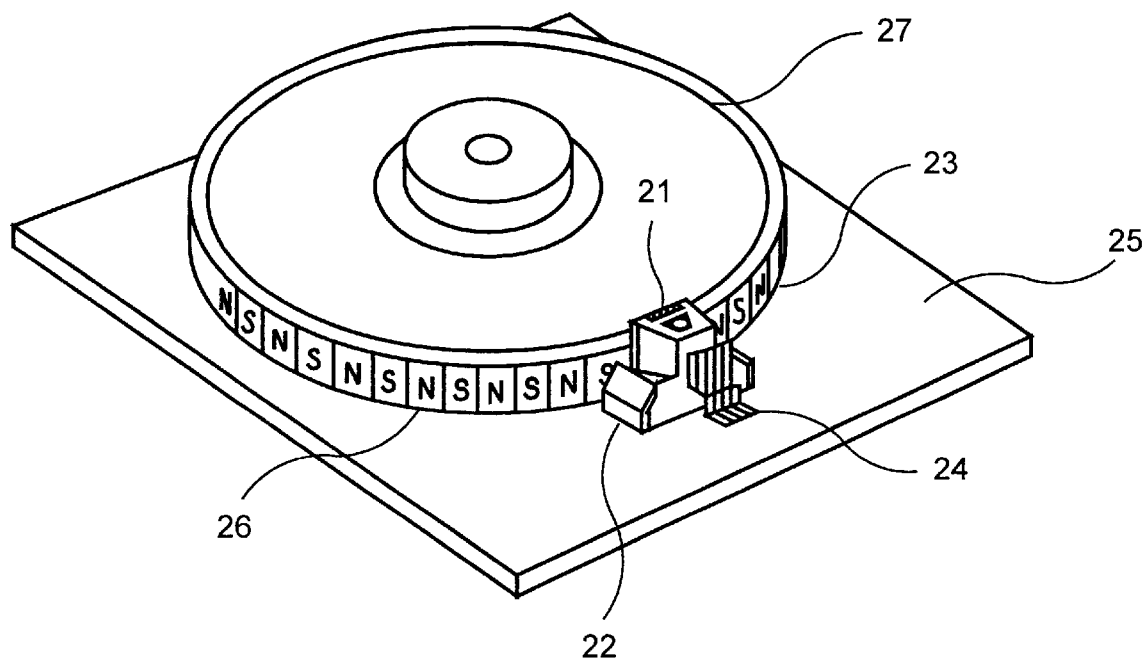
FIG. 10 is a vertical cross-section of a conventional motor.

Further, the present invention can be applied to a motor having a structure in which the FG signal generating portion as shown in FIG. 10 is formed on the outer peripheral surface of the motor magnet and the magnetic resistance sensor is arranged facing the FG signal generating portion from the outer side.

FIG. 9 is a schematic drawing showing a configuration when the present invention is applied to such a motor. The components in this figure corresponding to those in the above embodiment are coded the same, and they are not described.

As shown in this figure, the magnetic resistance sensor 1 is positioned opposite the index signal generating portion 8a via a gap, g, in the radial direction. The code a represents "the magnetized area where the magnetic field intensity in a plane orthogonal to the principal magnetic flux of the index signal generating portion 8a is greater than the rated sensitivity of the magnetic resistance sensor 1." In the magnetic field area, the magnetic resistance sensor 1 is positioned such that its magneto-sensitive surface 100 is orthogonal to the principal magnetic flux; also the output from the magnetic resistance sensor 1 is in a saturated state.

Even when configuring in this way, since the output property does not very much depend on the deviation of the gap, 9, between the magnetic resistance sensor 1 and the index signal generating portion 8a, the desired detection output can be obtained from the magnetic resistance sensor 1 as long as it is positioned within the magnetized area, $\alpha$.

As described above, in the motor comprising the magnetic resistance sensor of the present invention, the magnetized area, where the magnetic flux intensity in a plane orthogonal to the principal magnetic flux of the index signal generating portion is greater than the rated sensitivity of the magnetic resistance sensor, is formed by the index signal generating portion; the magnetic resistance sensor is arranged within the magnetized area such that its magneto-sensitive surface is in parallel with the plane; and the output from the magnetic resistance sensor is in a saturated state. Therefore, according to the present invention, the output from the magnetic resistance sensor is less affected by the deviation of the gap between the index signal generating portion and the magnetic resistance sensor. Accordingly, the positioning of the magnetic resistance sensor does not need to be highly precise, thus eliminating the conventional effort for highly accurate positioning of the magnetic resistance sensor and mechanical tools for it.

In addition, in the present invention, when the output side of the magnetic resistance sensor and the input side of the speed detection circuit to which the output from the sensor is input are coupled in low impedance, it can prevent the noise from being included in the sensor output and causing errors in detection of rotation speed and the like.

Further, when using a speed detection circuit in which a waveform shaping circuit is installed for eliminating the distortion of the output signal from the magnetic resistance sensor, the distortion generated in the output waveform of the magnetic resistance sensor can be eliminated through the waveform shaping circuit; therefore, errors in detection of the rotation speed and the like can be prevented.

While the foregoing description and drawings represent the preferred embodiments of the present invention, it will be obvious to those skilled in the art that various changes and modifications may be made therein without departing from the true spirit and scope of the present invention.

What is claimed is:

1. A motor comprising:

a rotor of the motor having a rotor magnet, said rotor magnet includes a driving motor portion and a frequency generator signal generating portion on said rotor magnet, said frequency generator signal generating portion having a plurality of N and S poles being alternatively magnetized at equal predetermined intervals, said frequency generator signal generating portion being magnetized with a narrower pitch of N and S poles than that of said driving portion, said frequency generator signal generating portion being magnetized by including between 240–360 poles;

a magnetic resistance sensor having a magneto-sensitive surface, said sensor being positioned on a stator of the motor facing said frequency generator signal generating portion of said rotor with a predetermined gap, for sensing a frequency generator signal in a magnetic field generated by said frequency generator signal generating portion during a rotation of said rotor wherein;

said magnetic resistance sensor comprises, a magneto-sensitive surface section for detecting said frequency generator signal and terminals electrically connected to said magneto-sensitive section;

a pair of a magnetic resistance devices which are in parallel along a direction identical to the rotational direction of said rotor and are formed on said magneto-sensitive section in micro patterns made of magnetic resistance film such that they are displaced by ½ pitch with respect to a magnetizing pitch of said frequency generator signal generating portion;

a speed detection circuit for detecting the speed of said motor based on the detection results of said magnetic resistance sensor;

wherein said frequency generator signal generating portion forming a magnetized area in which a magnetic flux intensity in a plane orthogonal to a principal magnetic flux of said frequency generator signal generating portion is greater than a rated sensitivity of said magnetic resistance sensor which results in said magnetic resistance sensor having an output signal which is in a saturated state in relation to all of said N and S poles of said frequency generator signal generating portion and which results in a through-rate for said output signal without errors at a zero cross point.

2. The motor as set forth in claim 1, wherein the output impedance of said magnetic resistance sensor and the input impedance of said speed detection circuit are coupled by low impedance.

3. The motor as set forth in claim 1, wherein said speed detection circuit comprises a waveform shaping circuit for eliminating distortions caused by the saturated output signal of said magnetic resistance sensor.

4. The motor as set forth in claim 3, wherein said waveform shaping circuit comprises a linear amplifier which linearly amplifies the saturated output signal of said magnetic resistance sensor and a window comparator which converts, from output values of said linear amplifier, said output values exceeding a predetermined window width into a predetermined value.

5. The motor as set forth in claim 1, wherein said index signal generating portion functions as a part of a driving magnetic portion for rotating said motor.

6. The motor as set forth in claim 1, wherein said magnetic resistance sensor comprises a magneto-sensitive section for detecting index signals in a magnetic field generated by said index signal generating portion and terminals electrically connected to said magneto-sensitive section; a pair of magnetic resistance devises which are parallel along the direction identical to the rotational direction of said rotor being formed on said magneto-sensitive section such that they are displaced by ½ pitch with respect to the magnetizing pitch of said index signal generating portion.

7. The motor as set forth in claim 1, wherein in each of the pair of magnetic resistance devices said pitch of said micro patterns of said magnetic resistance film arranged in parallel along the direction identical to the rotational direction of the rotor, is made wider compared to a conventional magnetic resistance device of the same standard.

8. The motor as set forth in claim 1, wherein said magnetic resistance sensor being positioned in said magnetized area such that its magneto-sensitive surface section is parallel to said frequency generator signal generating portion.

9. The motor as set in the claim 1, wherein said index signal generating portion is formed on an annular end surface of said rotor magnet, and said magnetized area is formed at the position in the motor thrust direction with respect to said index signal generating portion.

10. The motor as set forth in the claim 1, wherein said frequency generator signal generating portion being magnetized with about 240 magnetic poles in a circle.

* * * * *